(12) United States Patent
Zhuang et al.

(10) Patent No.: US 10,355,618 B2
(45) Date of Patent: Jul. 16, 2019

(54) ACTIVE NEUTRAL POINT CLAMPED INVERTER, ZERO-CROSSING SWITCHING METHOD AND ZERO-CROSSING SWITCHING APPARATUS THEREOF

(71) Applicant: SUNGROW POWER SUPPLY CO., LTD., Hefei, Anhui (CN)

(72) Inventors: Jiacai Zhuang, Anhui (CN); Yuqing Cui, Anhui (CN); Deyong Zhao, Anhui (CN); Xiaohui Luo, Anhui (CN); Chaoxuan Zhang, Anhui (CN); Jun Xu, Anhui (CN); Yilei Gu, Anhui (CN); Xinyu Wang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 15/950,666

(22) Filed: Apr. 11, 2018

(65) Prior Publication Data

US 2018/0316276 A1     Nov. 1, 2018

(30) Foreign Application Priority Data

Apr. 28, 2017 (CN) .......................... 2017 1 0291639

(51) Int. Cl.
*H02M 7/487*      (2007.01)
*H02M 1/00*      (2006.01)
(Continued)

(52) U.S. Cl.
CPC .............. *H02M 7/487* (2013.01); *H02M 1/08* (2013.01); *H02M 1/38* (2013.01); *H02M 2001/0058* (2013.01)

(58) Field of Classification Search
CPC ....................... H02M 2001/0058; H02M 7/487
See application file for complete search history.

(56) References Cited

U.S. PATENT DOCUMENTS

| | | | |
|---|---|---|---|
| 2003/0165071 A1 | 9/2003 | Bernet et al. | |
| 2005/0111246 A1* | 5/2005 | Lai ........................ | H02M 5/225 363/157 |

(Continued)

FOREIGN PATENT DOCUMENTS

| | | |
|---|---|---|
| CN | 103138620 A | 6/2013 |
| CN | 105186902 A | 12/2015 |
| EP | 3002867 A1 | 4/2016 |

OTHER PUBLICATIONS

Office Action regarding Chinese Patent Application No. 201710291639.3, dated Jul. 30, 2018. Translation provided by Unitalen Attorneys at Law.

(Continued)

*Primary Examiner* — Gary L Laxton
*Assistant Examiner* — Peter M Novak
(74) *Attorney, Agent, or Firm* — Harness, Dickey & Pierce, P.L.C.

(57) ABSTRACT

An ANPC inverter, a zero-crossing switching method and a zero-crossing switching apparatus of the ANPC inverter are provided. The method includes: controlling switch states of switch devices in a bridge leg to change according to a preset logic when zero-crossing switching occurs in an output voltage instruction of the bridge leg, so as to prevent overvoltage in the switch device in the bridge leg. The preset logic includes switching among a sequence of switch state combinations. Switch state combinations of the switch devices before and after the zero-crossing switching occurs are defined as the first and second switch state combinations of the sequence. The second to the penultimate switch state combinations are all safe switch state combinations selected in advance, in each of which a maximum voltage borne by the switch devices in the bridge leg is clamped to a safe limit value.

6 Claims, 6 Drawing Sheets

(51) Int. Cl.
    *H02M 1/08*  (2006.01)
    *H02M 1/38*  (2007.01)

(56) References Cited

U.S. PATENT DOCUMENTS

| | | | |
|---|---|---|---|
| 2006/0056209 A1 | 3/2006 | Blidberg et al. | |
| 2016/0352251 A1* | 12/2016 | Li | H02M 7/487 |
| 2018/0026569 A1* | 1/2018 | Yoshimura | H02P 27/14 |
| | | | 290/31 |

OTHER PUBLICATIONS

The Extended European Search Report regarding International Application No. 18162355.4 dated Sep. 20, 2018.
Andler et al., "Experimental Investigation of the Commutations of a 3L-ANPC Phase Leg Using 4.5-kV-5.5kA IGCTs" IEEE Transactions on Industrial Electronics, vol. 60, No. 11, Nov. 2013, pp. 4820-4830.

* cited by examiner

ACTIVE NEUTRAL POINT CLAMPED INVERTER, ZERO-CROSSING SWITCHING METHOD AND ZERO-CROSSING SWITCHING APPARATUS THEREOF

CROSS REFERENCE TO RELATED APPLICATION

The present application claims the priority to Chinese Patent Application No. 201710291639.3, titled "ACTIVE NEUTRAL POINT CLAMPED INVERTER, ZERO-CROSSING SWITCHING METHOD AND ZERO-CROSSING SWITCHING APPARATUS THEREOF", filed on Apr. 28, 2017 with the State Intellectual Property Office of the People's Republic of China, which is incorporated herein by reference in its entirety.

TECHNICAL FIELD

The present disclosure relates to the technical field of power electronics, and in particular to an active neutral point clamped inverter, a zero-crossing switching method of the active neutral point clamped inverter and a zero-crossing switching apparatus of the active neutral point clamped inverter.

BACKGROUND

As compared with a traditional neutral point clamped (NPC, diode neutral point clamped) inverter, an active neutral point clamped (ANPC) inverter includes a controllable switch to replace a clamping diode, in order to increase the number of degrees of freedom of the control system and achieve many control objectives.

FIG. 1 shows a topology of one bridge leg of an ANPC three-level inverter. The bridge leg includes switches T1 to T6, in which T1, T2 and T5 are respectively an outer transistor, an inner transistor and a clamping transistor of an upper half bridge leg, and T4, T3 and T6 are respectively an outer transistor, an inner transistor and a clamping transistor of a lower half bridge leg. In order to generate three levels ($-u_{DC}/2$, 0 and $u_{DC}/2$, where $u_{DC}$ is a direct-current bus voltage), conventional technology utilizes a modulation scheme that operates the two inner transistors at a high frequency while operating the two outer transistors and the two clamping transistors at the grid frequency. For example, FIG. 2 shows waveforms (sans a dead zone) of drive signals of the switches in the modulation scheme, where $u_O^*$ represents an output voltage instruction of the bridge leg, and M2_gT1 to M2_gT6 represent the waveforms of the drive signals of T1 to T6 in one period of the power frequency respectively.

With this modulation scheme, it can be ensured that a maximum voltage borne by the switches is $u_{DC}/2$ in both a positive half period and a negative half period of an output voltage of the bridge leg. However, switch states of at least four switches in the bridge leg are required to change simultaneously (referring to a time to) when zero-crossing switching occurs in $u_O^*$. It is an ideal case that switching actions of the switches can be completed simultaneously, and the maximum voltage borne by T1 to T6 is still $u_{DC}/2$. In fact, some of the switching actions of the switches may be completed before others, which results in a risk of overvoltage for some switches.

SUMMARY

In view of this, an ANPC inverter, a zero-crossing switching method of the ANPC inverter and a zero-crossing switching apparatus of the ANPC inverter are provided according to the present disclosure, so as to prevent an overvoltage from occurring in switches in any bridge leg of the ANPC inverter when zero-crossing switching occurs in an output voltage instruction of the bridge leg.

A zero-crossing switching method of an active neutral point clamped inverter is provided, which includes: acquiring an output voltage instruction of a bridge leg of the active neutral point clamped inverter; determining whether zero-crossing switching occurs in the output voltage instruction; and controlling switch states of all switches in the bridge leg to change according to a preset logic, in a case that the zero-crossing switching occurs in the output voltage instruction.

The preset logic includes switching among a sequence of switch state combinations. A first switch state combination of the sequence is defined as a switch state combination of all the switches in the bridge leg of the active neutral point clamped inverter before the zero-crossing switching occurs in the output voltage instruction of the bridge leg, and a last switch state combination of the sequence is defined as a switch state combination of all the switches in the bridge leg after the zero-crossing switching occurs in the output voltage instruction of the bridge leg. While transitioning from the first switch state combination to the last switch state combination. The second switch state combination to the penultimate switch state combination are all safe switch state combinations selected in advance, and in each of the safe switch state combination, a maximum voltage borne by the switches in the bridge leg is clamped to a safe limit value.

The safe limit value is one-half of a direct-current bus voltage in a case that the active neutral point clamped inverter is a three-level inverter.

The safe switch state combinations include a switch state combination in which at least one clamping transistor in the bridge leg is switched on and a switch state combination in which only two inner transistors in the bridge leg are switched on.

The switching among the sequence of switch state combinations includes: switching off one of the switches which is in a switched-on state in the previous switch state combination, or switching on one of the switches which is in a switched-off state in the previous switch state combination.

A zero-crossing switching apparatus of an active neutral point clamped inverter is provided, which includes: an acquiring unit configured to acquire an output voltage instruction of a bridge leg of the active neutral point clamped inverter; a determining unit configured to determine whether zero-crossing switching occurs in the output voltage instruction; and a switching control unit configured to control switch states of all switches in the bridge leg to change according to a preset logic, in a case that the determining unit determines that the zero-crossing switching occurs in the output voltage instruction.

The preset logic includes switching among a sequence of switch state combinations. A first switch state combination of the sequence is defined as a switch state combination of all the switches in the bridge leg of the active neutral point clamped inverter before the zero-crossing switching occurs in the output voltage instruction of the bridge leg, and a last switch state combination of the sequence is defined as a switch state combination of all the switches in the bridge leg after the zero-crossing switching occurs in the output voltage instruction of the bridge leg. While transitioning from the first switch state combination to the last switch state combination, the second switch state combination to the penultimate switch state combination are all safe switch state combinations selected in advance, and in each of the safe switch state combinations, a maximum voltage borne by the switches in the bridge leg is clamped to a safe limit value.

The safe limit value is one-half of a direct-current bus voltage in a case that the active neutral point clamped inverter is a three-level inverter.

The safe switch state combinations include a switch state combination in which at least one clamping transistor in the bridge leg is switched on and a switch state combination in which only two inner transistors in the bridge leg are switched on.

The switching among the sequence switch state combinations includes: switching off one of the switches which is in a switched-on state in the previous switch state combination, or switching on one of the switches which is in a switched-off state in the previous switch state combination.

An active neutral point clamped inverter is provided, which includes any one of the zero-crossing switching apparatuses of the active neutral point clamped inverter described above.

The active neutral point clamped inverter is a three-level inverter or a five-level inverter.

It can be seen from the above technical solutions that, in the present disclosure, when zero-crossing switching occurs in the output voltage instruction of a bridge leg of the ANPC inverter, the switch states of all the switches in the bridge leg are not switched randomly, but switched according to the preset logic. In the preset logic, a maximum voltage borne by the switches in the bridge leg is clamped to the safe limit value in the switch state combination at any time, thereby preventing an overvoltage from occurring in the switches in the bridge leg during the zero-crossing switching.

BRIEF DESCRIPTION OF THE DRAWINGS

In order to illustrate the technical solutions according to the embodiments of the present disclosure or in the conventional technology more clearly, the drawings required in description of the embodiments or conventional technology are introduced simply below. Apparently, the drawings in the following description show only some embodiments of the present disclosure, and other drawings may be obtained by those skilled in the art based on the provided drawings without creative work.

DETAILED DESCRIPTION OF THE EMBODIMENTS

The technical solutions according to the embodiments of the present disclosure will be described clearly and completely below in conjunction with the drawings in the embodiments of the present disclosure. It is apparent that the described embodiments are only a part rather than all of the embodiments of the present disclosure. Any other embodiments obtained by those skilled in the art without creative work based on the embodiments of the present disclosure fall within the protection scope of the present disclosure.

Figure 3:
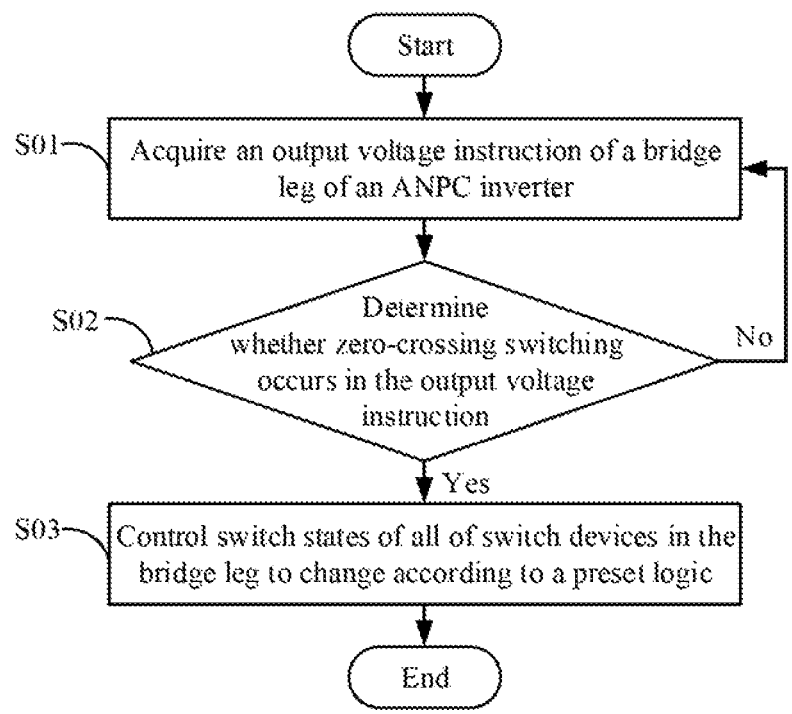
FIG. 3 is a flowchart of a zero-crossing switching method of an ANPC inverter according to an embodiment of the present disclosure.

Referring to FIG. 3, a zero-crossing switching method of an ANPC inverter is provided according to an embodiment of the present disclosure, to prevent an overvoltage from occurring in switches in any bridge leg of the ANPC inverter when zero-crossing switching occurs in an output voltage instruction of the bridge leg. The zero-crossing switching method of the ANPC inverter includes steps S01 to S03.

In step S01, an output voltage instruction of a bridge leg of the ANPC inverter is acquired.

In step S02, whether zero-crossing switching occurs in the output voltage instruction is determined. The zero-crossing switching method proceeds to step S03 in a case that the zero-crossing switching occurs in the output voltage instruction, otherwise the zero-crossing switching method returns to step S01.

In step S03, switch states of all switches in the bridge leg are controlled to change according to a preset logic.

For convenience of description, a first switch state combination and a last switch state combination are respectively defined as a switch state combination of all the switches in a bridge leg of the ANPC inverter before the zero-crossing switching occurs in the output voltage instruction of the bridge leg and a switch state combination of all the switches in the bridge leg after the zero-crossing switching occurs in the output voltage instruction of the bridge leg. The preset logic includes switching among multiple switch state combinations sequentially while transitioning from the first switch state combination to the last switch state combination. The second switch state combination to the penultimate switch state combination of the multiple switch state combinations are all safe switch state combinations selected from all of switch state combinations of all the switches in the bridge leg in advance. In each of the safe switch state combinations, a maximum voltage borne by the switches in the bridge leg is clamped to a safe limit value.

It can be known from the above description that, in the embodiment, when zero-crossing switching occurs in the output voltage instruction of a bridge leg of the ANPC inverter, the switch states of all the switches in the bridge leg are not switched randomly, but switched according to the preset logic. In the preset logic, a maximum voltage borne by the switches in the bridge leg is always clamped to the safe limit value in the switch state combination at any time, thereby preventing an overvoltage from occurring in the switches in the bridge leg during the zero-crossing switching.

The technical solution in the embodiment is described in detail below with the example of the bridge leg shown in FIG. 1.

Figure 1:
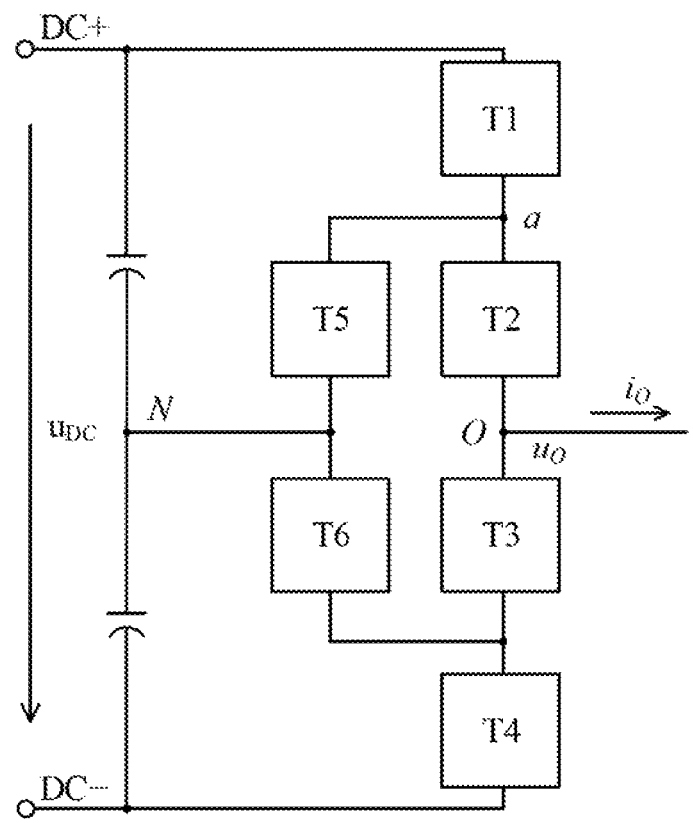
FIG. 1 is a schematic diagram showing a topology of one bridge leg in an ANPC three-level inverter in conventional technology.

The bridge leg shown in FIG. 1 includes 6 switches. System states are analyzed under conditions that different switches are switched on, to search for a condition under which a maximum voltage borne by the switches in the bridge leg is clamped to $U_{DC}/2$. A switch state combination of all the switches in the bridge leg corresponding to the found condition is a safe switch state combination. In the analysis process, it is assumed hereinafter that each of voltages of an upper voltage dividing capacitor and a lower voltage dividing capacitor of a direct-current bus is $u_{DC}/2$.

1. A system state in a case that only one switch in the bridge leg shown in FIG. 1 is switched on is shown in Table 1.

TABLE 1

| Switched-on switch devices | Output voltage $u_o$ of bridge leg | | Voltage borne by switch devices | |
|---|---|---|---|---|
| | $i_o > 0$ | $i_o < 0$ | $i_o > 0$ | $i_o < 0$ |
| T1 | $-u_{DC}/2$ | $u_{DC}/2$ | $u_{T1} = 0, u_{T2} = u_{DC}$ $u_{T3} = 0, u_{T4} = 0$ | $u_{T1} = 0, u_{T2} = 0$ $u_{T3} + u_{T4} = u_{DC}$ |
| T2 | 0 | $u_{DC}/2$ | $u_{T1} = u_{DC}/2, u_{T2} = 0$ $u_{T3} + u_{T4} = u_{DC}/2$ | $u_{T1} = 0, u_{T2} = 0$ $u_{T3} + u_{T4} = u_{DC}$ |
| T3 | $-u_{DC}/2$ | 0 | $u_{T1} + u_{T2} = u_{DC}$ $u_{T3} = 0, u_{T4} = 0$ | $u_{T1} + u_{T2} = u_{DC}/2$ $u_{T3} = 0, u_{T4} = 0$ |
| T4 | $-u_{DC}/2$ | $u_{DC}/2$ | $u_{T1} + u_{T2} = u_{DC}$ $u_{T3} = 0, u_{T4} = 0$ | $u_{T1} = 0, u_{T2} = 0$ $u_{T3} = u_{DC}, u_{T4} = 0$ |
| <u>T5</u> | $-u_{DC}/2$ | 0 | $u_{T1} = u_{DC}/2, u_{T2} = u_{DC}/2$ $u_{T3} = 0, u_{T4} = 0$ | $u_{T1} = u_{DC}/2, u_{T2} = 0$ $u_{T3} + u_{T4} = u_{DC}/2$ |
| <u>T6</u> | 0 | $-u_{DC}/2$ | $u_{T1} + u_{T2} = u_{DC}/2$ $u_{T3} = 0, u_{T4} = u_{DC}/2$ | $u_{T1} = 0, u_{T2} = 0$ $u_{T3} = u_{DC}/2, u_{T4} = u_{DC}/2$ |

A case that only T1 is switched on is taken as an example. An output voltage of the bridge leg is $u_O = -u_{DC}/2$ in a case that a current of the bridge leg is $i_o > 0$, in which case, a voltage borne by T1 is $u_{T1} = 0$, a voltage borne by T2 is $u_{T2} = u_{DC}$, a voltage borne by T3 is $u_{T3} = 0$, and a voltage borne by T4 is $u_{T4} = 0$. $u_O = u_{DC}/2$ in a case of $i_o < 0$, in which case, a voltage borne by T1 is $u_{T1} = 0$, a voltage borne by T2 is $u_{T2} = 0$, and a voltage borne by T3 and T4 together is $u_{T1} + u_{T4} = u_{DC}$. Because $u_{T2} = u_{DC}$, that is, an overvoltage occurs in T2, the switch state combination in which only T1 is switched on cannot serve as a safe switch state combination. In addition, in a case of $u_{T1} + u_{T4} = u_{DC}$, it is ideal that each of T3 and T4 bears a voltage of $u_{DC}/2$. In practice, since there is always a certain difference between parameters of the switches, the voltage borne by one of T3 and T4 is greater than $u_{DC}/2$, i.e., overvoltage occurs in practice, which also confirms that the switch state combination in which only T1 is switched on cannot serve as a safe switch state combination.

It can be seen from Table 1 that, in the case that only one switch is switched on, the switch state combination in which only T5 or T6 is switched on can serve as a safe switch state combination, which are indicated by underlines in Table 1.

2. A system state in a case that two switches in the bridge leg shown in FIG. 1 are both switched on is shown in Table 2.

In a case that two switches in the bridge leg shown in FIG. 1 are both switched on, an outer transistor and a clamping transistor at the same side should not be both switched on, otherwise a bus capacitor at the side is short-circuited. Therefore, the cases that "T1 and T5 are both switched on" and "T4 and T6 are both switched on" are not considered in Table 2.

TABLE 2

| Switched-on switch devices | Output voltage $u_o$ of bridge leg | | Voltage borne by switch devices | |
|---|---|---|---|---|
| | $i_o > 0$ | $i_o < 0$ | $i_o > 0$ | $i_o < 0$ |
| T1, T2 | $u_{DC}/2$ | $u_{DC}/2$ | $u_{T1} = 0, u_{T2} = 0$ $u_{T3} + u_{T4} = u_{DC}$ | $u_{T1} = 0, u_{T2} = 0$ $u_{T3} + u_{T4} = u_{DC}$ |
| T1, T3 | $-u_{DC}/2$ | 0 | $u_{T1} = 0, u_{T2} = u_{DC}$ $u_{T3} = 0, u_{T4} = 0$ | $u_{T1} = 0, u_{T2} = u_{DC}/2$ $u_{T3} = 0, u_{T4} = u_{DC}/2$ |
| T1, T4 | $-u_{DC}/2$ | $u_{DC}$ | $u_{T1} = 0, u_{T2} = u_{DC}$ $u_{T3} = 0, u_{T4} = 0$ | $u_{T1} = 0, u_{T2} = 0$ $u_{T3} = u_{DC}, u_{T4} = 0$ |
| <u>T1, T6</u> | 0 | $u_{DC}/2$ | $u_{T1} = 0, u_{T2} = u_{DC}/2$ $u_{T3} = 0, u_{T4} = u_{DC}/2$ | $u_{T1} = 0, u_{T2} = 0$ $u_{T3} = u_{DC}/2, u_{T4} = u_{DC}/2$ |
| <u>T2, T3</u> | 0 | 0 | $u_{T1} = u_{DC}/2, u_{T2} = 0$ $u_{T3} = 0, u_{T4} = u_{DC}/2$ | $u_{T1} = u_{DC}/2, u_{T2} = 0$ $u_{T3} = 0, u_{T4} = u_{DC}/2$ |
| T2, T4 | 0 | $u_{DC}/2$ | $u_{T1} = u_{DC}/2, u_{T2} = 0$ $u_{T3} = u_{DC}, u_{T4} = 0$ | $u_{T1} = 0, u_{T2} = 0$ $u_{T3} = u_{DC}, u_{T4} = 0$ |
| <u>T2, T5</u> | 0 | 0 | $u_{T1} = u_{DC}/2, u_{T2} = 0$ $u_{T3} + u_{T4} = u_{DC}/2$ | $u_{T1} = u_{DC}/2, u_{T2} = 0$ $u_{T3} + u_{T4} = u_{DC}/2$ |
| T2, T6 | 0 | $u_{DC}/2$ | $u_{T1} = u_{DC}/2, u_{T2} = 0$ $u_{T3} = 0, u_{T4} = u_{DC}/2$ | $u_{T1} = 0, u_{T2} = 0$ $u_{T3} = u_{DC}/2, u_{T4} = u_{DC}/2$ |
| T3, T4 | $-u_{DC}/2$ | $-u_{DC}/2$ | $u_{T1} + u_{T2} = u_{DC}$ $u_{T3} = 0, u_{T4} = 0$ | $u_{T1} + u_{T2} = u_{DC}$ $u_{T3} = 0, u_{T4} = 0$ |
| <u>T3, T5</u> | $-u_{DC}/2$ | 0 | $u_{T1} = u_{DC}/2, u_{T2} = u_{DC}/2$ $u_{T3} = 0, u_{T4} = 0$ | $u_{T1} = u_{DC}/2, u_{T2} = 0$ $u_{T3} = 0, u_{T4} = u_{DC}/2$ |
| <u>T3, T6</u> | 0 | 0 | $u_{T1} + u_{T2} = u_{DC}/2$ $u_{T3} = 0, u_{T4} = u_{DC}/2$ | $u_{T1} + u_{T2} = u_{DC}/2$ $u_{T3} = 0, u_{T4} = u_{DC}/2$ |

TABLE 2-continued

| Switched-on switch devices | Output voltage $u_o$ of bridge leg | | Voltage borne by switch devices | |
|---|---|---|---|---|
| | $i_o > 0$ | $i_o < 0$ | $i_o > 0$ | $i_o < 0$ |
| T4, T5 | $-u_{DC}/2$ | 0 | $u_{T1} = u_{DC}/2$, $u_{T2} = u_{DC}/2$ $u_{T3} = 0$, $u_{T4} = 0$ | $u_{T1} = u_{DC}/2$, $u_{T2} = 0$ $u_{T3} = u_{DC}/2$, $u_{T4} = 0$ |
| T5, T6 | 0 | 0 | $u_{T1} = u_{DC}/2$, $u_{T2} = 0$ $u_{T3} = 0$, $u_{T4} = u_{DC}/2$ | $u_{T1} = u_{DC}/2$, $u_{T2} = 0$ $u_{T3} = 0$, $u_{T4} = u_{DC}/2$ |

It can been seen from Table 2 that, in a case that only two switches are switched on, the switch state combinations that "T1 and T6 are both switched on", "T2 and T3 are both switched on", "T2 and T5 are both switched on", "T2 and T6 are both switched on", "T3 and T5 are both switched on", "T3 and T6 are both switched on", "T4 and T5 are both switched on" and "T5 and T6 are both switched on" may serve as safe switch state combinations, which are indicated by underlines in Table 2.

3. A system state in a case that three switches in the bridge leg shown in FIG. 1 are all switched on is shown in Table 3.

In a case that the three switches in the bridge leg shown in FIG. 1 are all switched on, not only the outer transistor and the clamping transistor at the same side should not be both switched on, but also two outer transistors and one inner transistor should not be all switched on and two inner transistors and one outer transistor should not be all switched on, otherwise it is inevitable that one of the switches directly bears a direct-current bus voltage $u_{DC}$. Therefore, the cases that "T1 and T5 are both switched on", "T4 and T6 are both switched on" and "any three of T1 to T4 are all switched on" are not considered in Table 3.

5. The bus capacitor is short-circuited under a condition that five or more switches in the bridge leg shown in FIG. 1 are all switched on, and therefore there is no safe switch state combination.

6. There is no safe switch state combination in a case that no switch in the bridge leg shown in FIG. 1 is switched on, for the reason as follows.

In a case that no switch in the bridge leg shown in FIG. 1 is switched on, the switch having a switched-on antiparallel diode is determined by a freewheeling circuit. In a case that $i_o$ flows out from point O, antiparallel diodes of T3 and T4 are switched on, a voltage at point O is equal to a negative bus voltage, and T1 and T2 bear the direct-current bus voltage $u_{DC}$ together. Since an antiparallel diode of T5 is not switched on, a level at point a is unknown. If there is a difference between parasite parameters of the transistors T1 and T2, it cannot be ensured that each of T1 and T2 bears a voltage of $u_{DC}/2$, that is, there is no safe switch state combination. Similarly, a case that $i_o$ flows into point O can be analyzed.

In summary, all of the safe switch state combinations of all the switches in the bridge leg shown in FIG. 1 are enumerated in Table 4.

TABLE 3

| Switched-on switch devices | Output voltage $u_o$ of bridge leg | | Voltage borne by switch devices | |
|---|---|---|---|---|
| | $i_o > 0$ | $i_o < 0$ | $i_o > 0$ | $i_o < 0$ |
| T1, T2, T6 | $u_{DC}/2$ | $u_{DC}/2$ | $u_{T1} = 0$, $u_{T2} = 0$ $u_{T3} = u_{DC}/2$, $u_{T4} = u_{DC}/2$ | $u_{T1} = 0$, $u_{T2} = 0$ $u_{T3} = u_{DC}/2$, $u_{T4} = u_{DC}/2$ |
| T1, T3, T6 | 0 | 0 | $u_{T1} = 0$, $u_{T2} = u_{DC}/2$ $u_{T3} = 0$, $u_{T4} = u_{DC}/2$ | $u_{T1} = 0$, $u_{T2} = u_{DC}/2$ $u_{T3} = 0$, $u_{T4} = u_{DC}/2$ |
| T2, T3, T5 | 0 | 0 | $u_{T1} = u_{DC}/2$, $u_{T2} = 0$ $u_{T3} = 0$, $u_{T4} = u_{DC}/2$ | $u_{T1} = u_{DC}/2$, $u_{T2} = 0$ $u_{T3} = 0$, $u_{T4} = u_{DC}/2$ |
| T2, T3, T6 | 0 | 0 | $u_{T1} = u_{DC}/2$, $u_{T2} = 0$ $u_{T3} = 0$, $u_{T4} = u_{DC}/2$ | $u_{T1} = u_{DC}/2$, $u_{T2} = 0$ $u_{T3} = 0$, $u_{T4} = u_{DC}/2$ |
| T2, T4, T5 | 0 | 0 | $u_{T1} = u_{DC}/2$, $u_{T2} = 0$ $u_{T3} = 0$, $u_{T4} = u_{DC}/2$ | $u_{T1} = u_{DC}/2$, $u_{T2} = 0$ $u_{T3} = 0$, $u_{T4} = u_{DC}/2$ |
| T2, T5, T6 | 0 | 0 | $u_{T1} = u_{DC}/2$, $u_{T2} = 0$ $u_{T3} = 0$, $u_{T4} = u_{DC}/2$ | $u_{T1} = u_{DC}/2$, $u_{T2} = 0$ $u_{T3} = 0$, $u_{T4} = u_{DC}/2$ |
| T3, T4, T5 | $-u_{DC}/2$ | $-u_{DC}/2$ | $u_{T1} = u_{DC}/2$, $u_{T2} = u_{DC}/2$ $u_{T3} = 0$, $u_{T4} = 0$ | $u_{T1} = u_{DC}/2$, $u_{T2} = u_{DC}/2$ $u_{T3} = 0$, $u_{T4} = 0$ |
| T3, T5, T6 | 0 | 0 | $u_{T1} = u_{DC}/2$, $u_{T2} = 0$ $u_{T3} = 0$, $u_{T4} = u_{DC}/2$ | $u_{T1} = u_{DC}/2$, $u_{T2} = 0$ $u_{T3} = 0$, $u_{T4} = u_{DC}/2$ |

It can be seen from Table 3 that each of the switch state combinations listed in Table 3 is a safe switch state combination, which are indicated by underlines in Table 3.

4. In a case that four switches in the bridge leg shown in FIG. 1 are all switched on, only one switch state combination in which T2, T3, T5 and T6 are all switched on is a safe switch state combination. In such case, an output voltage of the bridge leg is $u_O=0$, and voltages borne by the switches are: $u_{T1}=u_{DC}/2$, $u_{T2}=0$, $u_{T3}=0$ and $u_{T4}=u_{DC}/2$.

TABLE 4

| | The number of switched-on transistor devices | | | |
|---|---|---|---|---|
| | 1 | 2 | 3 | 4 |
| Switched-on transistor devices | T5; T6; | T1, T6; T2, T3; T2, T5; T2, T6; T3, T5; T3, T6; | T1, T2, T6; T1, T3, T6; T2, T3, T5; T2, T3, T6; T2, T4, T5; T2, T5, T6; | T2, T3, T5, T6; |

TABLE 4-continued

| | The number of switched-on transistor devices | | |
|---|---|---|---|
| 1 | 2 | 3 | 4 |
| | T4, T5; T5, T6; | T3, T4, T5; T3, T5, T6; | |

It can be known from the above description that, in a case that the ANPC inverter is a three-level inverter, a safe switch state combination is a switch state combination in which a maximum voltage borne by the switches is clamped to $u_{DC}/2$. Based on this criterion, a switch state combination that at least one clamping transistor in the bridge leg is switched on and a switch state combination that only two inner transistors in the bridge leg are switched on may be selected as safe switch state combinations.

Figure 2:
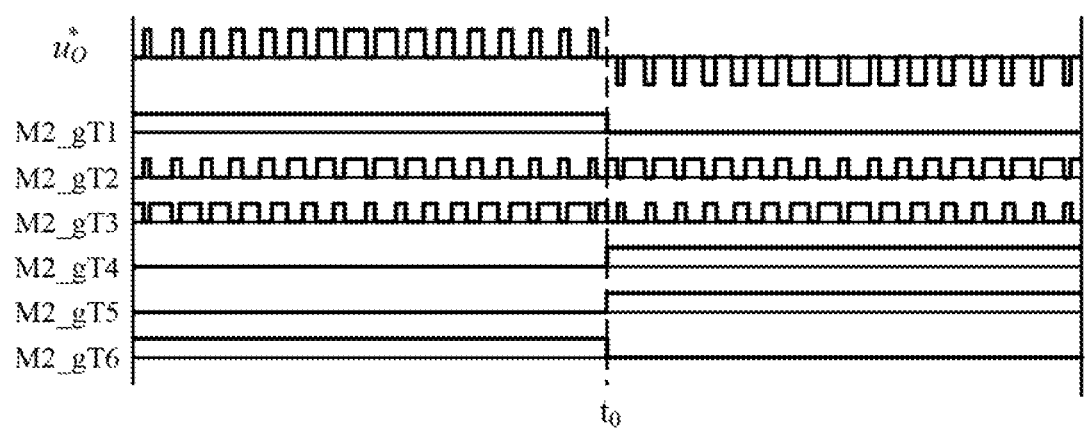
FIG. 2 is a schematic waveform diagram of drive signals of all switches in conventional technology.

When positive-to-negative zero-crossing switching occurs in the output voltage instruction of the bridge leg shown in FIG. 1, it can be known from FIG. 2 that T1 and T6 are both switched on in the first switch state combination, and T4 and T5 are all switched on in the last stage switch state combination. Therefore, switching actions to be completed during the zero-crossing switching includes: switching off T1 and T6 and switching on T4 and T5. Since a switch state of only one switch can be changed at a time instant, it can be known from Table 4 that, in the positive-to-negative zero-crossing switching, the switching among multiple switch state combinations may be switching from the switch state combination in which "T1, T6" are switched on (the first switch state combination) to the switch state combination in which "T6" is switched on (the second switch state combination), then to the switch state combination in which "T5, T6" are switched on (the third switch state combination), then to the switch state combination in which "T5" is switched on (the fourth switch state combination), and then to the switch state combination in which "T4, T5" are switched on (the last switch state combination).

Figure 7:
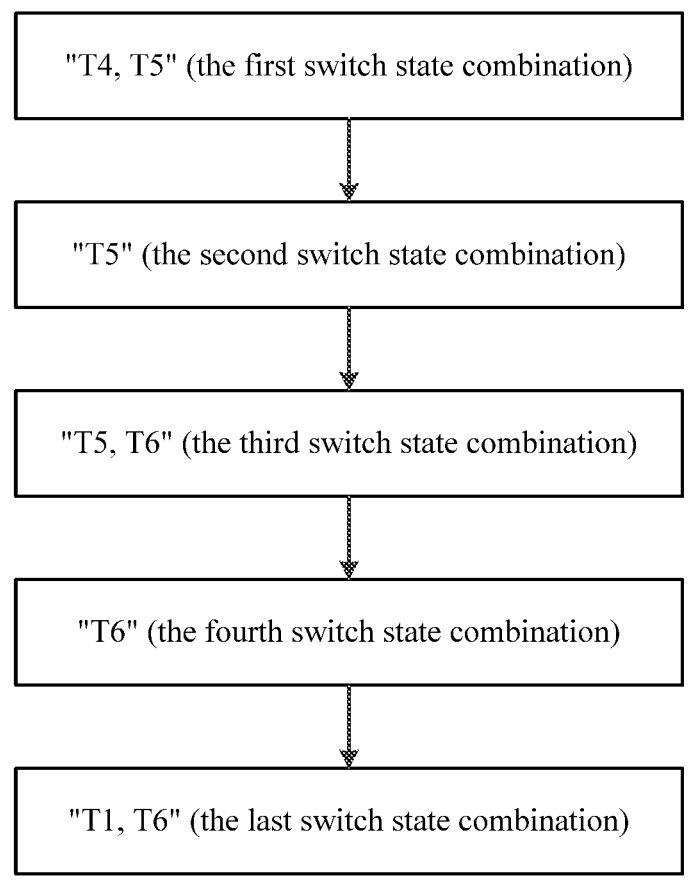
FIG. 7 is a schematic diagram showing an exemplary sequence of switch state combinations.

When negative-to-positive zero-crossing switching occurs in the output voltage instruction of the bridge leg shown in FIG. 1, it can be known from FIG. 2 that T4 and T5 are both switched on in the first switch state combination, and T1 and T6 are both switched on in the last switch state combination. Therefore, switching actions to be completed in the zero-crossing switching includes: switching off T4 and T5 and switching on T1 and T6. Since a switch state of only one switch can be changed at a time instant, it can be known from Table 4 that, in the negative-to-positive zero-crossing switching, the switching among multiple switch state combinations may be switching from the switch state combination in which "T4, T5" are switched on (the first switch state combination) to the switch state combination in which "T5" is switched on (the second switch state combination), then to the switch state combination in which "T5, T6" are switched on (the third switch state combination), then to the switch state combination in which "T6" is switched on (the fourth switch state combination), and then to the switch state combination in which "T1, T6" are switched on (the last switch state combination), as shown in FIG. 7.

Figure 4:
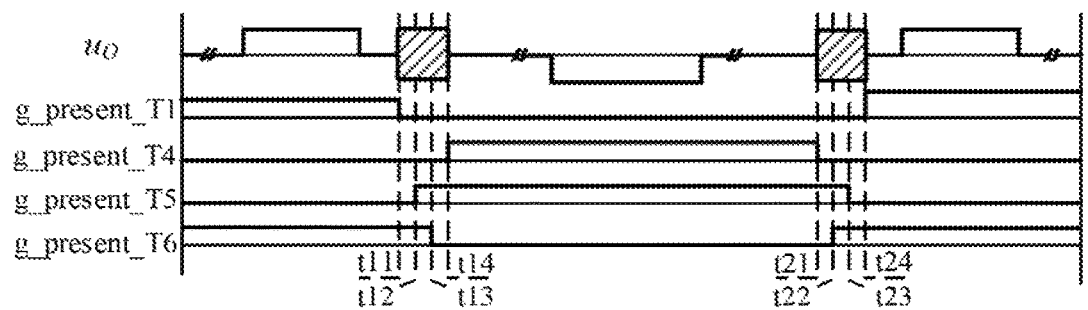
FIG. 4 is a schematic waveform diagram of drive signals of all switches operating at a power frequency according to an embodiment of the present disclosure.

Corresponding to the above switching among the multiple switch state combinations, FIG. 4 shows waveforms (g_present_T1, g_present_T4, g_present_T5 and g_present_T6 represent waveforms of drive signals of T1, T4, T5 and T6 respectively) of drive signals of all switches operating at a grid frequency. The switching time are illustrated as follows.

(1) In a case that positive-to-negative zero-crossing switching occurs in the output voltage instruction of the bridge leg shown in FIG. 1, T1 is first switched off at a time t11, then T5 is switched on at a time t12, then T6 is switched off at a time t13, and finally T4 is switched on at a time t14.

(2) In a case that negative-to-positive zero-crossing switching occurs in the output voltage instruction of the bridge leg shown in FIG. 1, T4 is first switched off at a time t21, then T6 is switched on at a time t22, then T5 is switched off at a time t23, and finally T1 is switched on at a time t24.

The magnitude of an output voltage of the bridge leg in the zero-crossing switching is related to switch states of the high-frequency switches T2 and T3, which is shaded in FIG. 4.

Extending the above manner of switching among the multiple switch state combinations to be applied in any type of ANPC inverter, the switching may include switching off one switch which is in a switched-on state in a previous switch state combination, or switching on one switch which is in a switched-off in a previous switch state combination.

It should be noted that the above manner of switching among the multiple switch state combinations is only an example, and the switching may be performed in other manners. For example, when positive-to-negative zero-crossing switching occurs in the output voltage instruction of the bridge leg shown in FIG. 1, the switching among the multiple switch state combinations may also be switching from the switch state combination in which "T1, T2, T6" are switched on (the first stage switch state combination) to the switch state combination in which "T2, T6" are switched on (the second switch state combination), then to the switch state combination in which "T2, T5, T6" are switched on (the third switch state combination), then to the switch state combination in which "T2, T5" are switched on (the fourth switch state combination), and finally to the switch state combination in which "T2, T4, T5" are switched on (the last switch state combination). When negative-to-positive zero-crossing switching occurs in the output voltage instruction of the bridge leg shown in FIG. 1, the switching among the multiple switch state combinations may also be switching from the switch state combination in which "T2, T4, T5" are switched on (the first switch state combination) to the switch state combination in which "T2, T5" are switched on (the second switch state combination), then to the switch state combination in which "T2, T5, T6" are switched on (the third switch state combination), then to the switch state combination in which "T2, T6" are switched on (the fourth switch state combination), and finally to the switch state combination in which "T1, T2, T6" are switched on (the last switch state combination).

Figure 5:
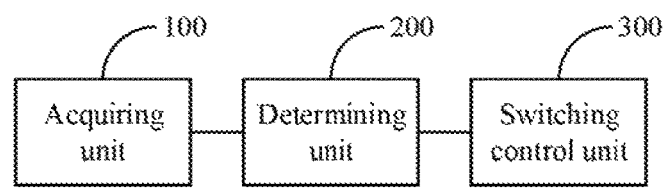
FIG. 5 is a schematic structural diagram of a zero-crossing switching apparatus of an ANPC inverter according to an embodiment of the present disclosure.

Referring to FIG. 5, a zero-crossing switching apparatus of an ANPC inverter is further provided according to an embodiment of the present disclosure, which includes an acquiring unit 100, a determining unit 200 and a switching control unit 300.

The acquiring unit 100 is configured to acquire an output voltage instruction of a bridge leg of the ANPC inverter.

The determining unit 200 is configured to determine whether zero-crossing switching occurs in the output voltage instruction.

The switching control unit 300 is configured to control switch states of all switches in the bridge leg to change according to a preset logic, in a case that the determining unit 200 determines that the zero-crossing switching occurs in the output voltage instruction.

Specifically, a first switch state combination and a last switch state combination are respectively defined as a switch state combination of all the switches in a bridge leg of the ANPC inverter before the zero-crossing switching occurs in the output voltage instruction of the bridge leg and a switch state combination of all the switches in the bridge leg after the zero-crossing switching occurs in the output voltage instruction of the bridge leg. The preset logic includes switching among multiple switch state combinations sequentially while transitioning from the first switch state combination to the last switch state combination. The second switch state combination to the penultimate switch state combination of the multiple switch state combinations are safe switch state combinations selected from all of switch state combinations of all the switches in the bridge leg in advance. In each of the safe switch state combinations, a maximum voltage borne by the switches in the bridge leg is clamped to a safe limit value.

The safe limit value is one-half of a direct-current bus voltage in a case that the ANPC inverter is three-level inverter.

The safe switch state combination includes a switch state combination in which at least one clamping transistor in the bridge leg is switched on and a switch state combination in which only two inner transistors in the bridge leg are switched on.

The switching among the multiple switch state combinations includes: switching off one switch which is in a switched-on state in the previous switch state combination, or switching on one switch which is in a switched-off state in the previous switch state combination.

Figure 6:
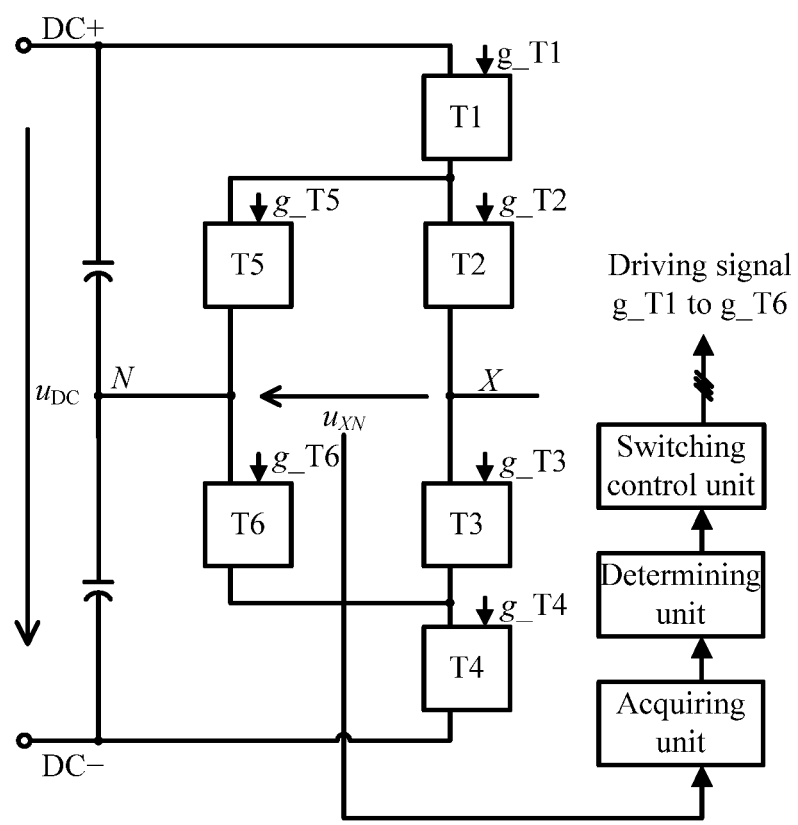
FIG. 6 is a schematic structural diagram of an ANPC inverter according to an embodiment of the present disclosure.

In addition, an ANPC inverter is further provided according to an embodiment of the present disclosure, which includes any one of the zero-crossing switching apparatus described above, as show in FIG. 6. The ANPC inverter may be a three-level inverter or a five-level inverter, which is not limited herein.

In summary, in the present disclosure, when zero-crossing switching occurs in the output voltage instruction of a bridge leg of the ANPC inverter, the switch states of all the switches in the bridge leg are not switched randomly, but switched according to the preset logic. In the preset logic, a maximum voltage borne by the switches in the bridge leg is always clamped to the safe limit value in the switch state combination at any time, thereby preventing an overvoltage from occurring in the switches in the bridge leg during the zero-crossing switching.

The embodiments of the present disclosure are described in a progressive manner, and each embodiment is focused on describing difference from other embodiments, and reference may be made one to another for the same or similar parts among the embodiments. Since the apparatus disclosed in the embodiment corresponds to the method disclosed in the embodiment, the description for the apparatus is simple, and reference may be made to the method in the embodiment for the relevant parts.

Based on the above description of the embodiments, those skilled in the art can implement or use the present disclosure. Numerous modifications to the embodiments are apparent to those skilled in the art, and the general principles defined herein can be implemented in other embodiments without deviating from the spirit or scope of the present disclosure. Therefore, the present disclosure is not limited to the embodiments described herein, but conforms to the widest scope consistent with the principles and novel features disclosed herein.

The invention claimed is:

1. A zero-crossing switching method of an active neutral point clamped inverter, comprising:

acquiring an output voltage instruction of a bridge leg of the active neutral point clamped inverter;
determining whether zero-crossing switching occurs in the output voltage instruction; and
controlling switch states of all switches in the bridge leg to change according to a preset logic, in a case that the zero-crossing switching occurs in the output voltage instruction; wherein
the preset logic comprises switching among a sequence of switch state combinations, a first switch state combination of the sequence is defined as a switch state combination of all the switches in the bridge leg of the active neutral point clamped inverter before the zero-crossing switching occurs in the output voltage instruction of the bridge leg and a last switch state combination of the sequence is defined as a switch state combination of all the switches in the bridge leg after the zero-crossing switching occurs in the output voltage instruction of the bridge leg,
while transitioning from the first switch state combination to the last switch state combination, a second switch state combination to a penultimate switch state combination are all safe switch state combinations selected in advance, and in each of the safe switch state combinations, a maximum voltage borne by the switches in the bridge leg is clamped to a safe limit value, and
in a case that the active neutral point clamped inverter is a three-level inverter, the safe limit value is one-half of a direct-current bus voltage, and the safe switch state combinations comprise:
a switch state combination in which at least one clamping transistor in the bridge lea is switched on, and
a switch state combination in which only two inner transistors in the bridge lea are switched on.

2. The zero-crossing switching method of the active neutral point clamped inverter according to claim 1, wherein the switching among the sequence of switch state combinations comprises:
switching off one of the switches which is in a switched-on state in a previous switch state combination; or
switching on one of the switches which is in a switched-off state in the previous switch state combination.

3. A zero-crossing switching apparatus of an active neutral point clamped inverter, comprising:
an acquiring unit configured to acquire an output voltage instruction of a bridge leg of the active neutral point clamped inverter;
a determining unit configured to determine whether zero-crossing switching occurs in the output voltage instruction; and
a switching control unit configured to control switch states of all switches in the bridge leg to change according to a preset logic, in a case that the determining unit determines that the zero-crossing switching occurs in the output voltage instruction; wherein
the preset logic comprises switching among a sequence of switch state combinations, a first switch state combination of the sequence is defined as a switch state combination of all the switches in the bridge leg of the active neutral point clamped inverter before the zero-crossing switching occurs in the output voltage instruction of the bridge leg and a last switch state combination of the sequence is defined as a switch state combination of all the switches in the bridge leg after the zero-crossing switching occurs in the output voltage instruction of the bridge leg, while transitioning from the first switch state combination to the last switch state combination, a second switch state combination to a penultimate switch state combination are all safe switch state combinations selected in advance, and in each of the safe switch state combinations, a maximum voltage borne by the switches in the bridge leg is clamped to a safe limit value, and in a case that the active neutral point clamped inverter is a three-level inverter, the safe limit value is one-half of a direct-current bus voltage, and the safe switch state combinations comprise:

a switch state combination in which at least one clamping transistor in the bridge lea is switched on, and a switch state combination in which only two inner transistors in the bridge lea are switched on.

4. The zero-crossing switching apparatus of the active neutral point clamped inverter according to claim), wherein the switching among the sequence of switch state combinations comprises:

switching off one of the switches which is in a switched-on state in a previous switch state combination; or switching on one of the switches which is in a switched-off state in the previous switch state combination.

5. An active neutral point clamped inverter, comprising a zero-crossing switching apparatus, wherein the zero-crossing switching apparatus comprises:

an acquiring unit configured to acquire an output voltage instruction of a bridge leg of the active neutral point clamped inverter;

a determining unit configured to determine whether zero-crossing switching occurs in the output voltage instruction; and a switching control unit configured to control switch states of all switches in the bridge leg to change according to a preset logic, in a case that the determining unit determines that the zero-crossing switching occurs in the output voltage instruction; wherein the preset logic comprises switching among a sequence of switch state combinations, a first switch state combination of the sequence is defined as a switch state combination of all the switches in the bridge leg of the active neutral point clamped inverter before the zero-crossing switching occurs in the output voltage instruction of the bridge leg and a last switch state combination of the sequence is defined as a switch state combination of all the switches in the bridge leg after the zero-crossing switching occurs in the output voltage instruction of the bridge leg, while transitioning from the first switch state combination to the last switch state combination, a second switch state combination to a penultimate switch state combination are all safe switch state combinations selected in advance, and in each of the safe switch state combinations, a maximum voltage borne by the switches in the bridge leg is clamped to a safe limit value, and in a case that the active neutral point clamped inverter is a three-level inverter, the safe limit value is one-half of a direct-current bus voltage, and the safe switch state combinations comprise:

a switch state combination in which at least one clamping transistor in the bridge lea is switched on, and a switch state combination in which only two inner transistors in the bridge lea are switched on.

6. The active neutral point clamped inverter according to claim 5, wherein the switching among the sequence of switch state combinations comprises:

switching off one of the switches which is in a switched-on state in a previous switch state combination; or switching on one of the switches which is in a switched-off state in the previous switch state combination.

* * * * *